(12) United States Patent
Watters et al.

(10) Patent No.: US 9,749,344 B2
(45) Date of Patent: Aug. 29, 2017

(54) SYSTEM AND METHOD OF CYBER THREAT INTENSITY DETERMINATION AND APPLICATION TO CYBER THREAT MITIGATION

(71) Applicant: iSIGHT Partners, Inc., Dallas, TX (US)

(72) Inventors: John P. Watters, Dallas, TX (US); Frederick Doyle, Albuquerque, NM (US); Henry Peltokangas, Fairfax, VA (US); Matthew Keane, Dallas, TX (US)

(73) Assignee: FireEye, Inc., Milpitas, CA (US)

( * ) Notice: Subject to any disclaimer, the term of this patent is extended or adjusted under 35 U.S.C. 154(b) by 552 days.

(21) Appl. No.: 14/244,886

(22) Filed: Apr. 3, 2014

(65) Prior Publication Data

US 2016/0241581 A1   Aug. 18, 2016

(51) Int. Cl.
| | | |
|---|---|---|
| *H04L 29/06* | (2006.01) | |
| *G06F 17/30* | (2006.01) | |
| *G06Q 10/00* | (2012.01) | |
| *G06F 21/55* | (2013.01) | |

(52) U.S. Cl.
CPC .... *H04L 63/1433* (2013.01); *G06F 17/30994* (2013.01); *G06F 21/552* (2013.01); *G06Q 10/00* (2013.01); *H04L 63/1441* (2013.01)

(58) Field of Classification Search
CPC .................................................. H04L 63/1433
USPC ......................................................... 726/25
See application file for complete search history.

(56) References Cited

U.S. PATENT DOCUMENTS

| 6,947,978 B2 | 9/2005 | Huffman et al. |
| 7,234,168 B2 | 6/2007 | Gupta et al. |
| 7,293,287 B2 | 11/2007 | Fischman et al. |
| 7,308,715 B2 | 12/2007 | Gupta et al. |
| 7,409,714 B2 | 8/2008 | Gupta et al. |
| 7,457,823 B2 | 11/2008 | Shraim et al. |

(Continued)

FOREIGN PATENT DOCUMENTS

| WO | 2009083036 A1 | 7/2009 |
| WO | 2009148724 A1 | 12/2009 |

OTHER PUBLICATIONS

Pre-Interview Communication dated Dec. 15, 2014, U.S. Appl. No. 13/862,373, filed Apr. 12, 2013.

(Continued)

*Primary Examiner* — Jacob Lipman (57) ABSTRACT

A security system comprising a computer, a memory, a data store comprising a plurality of consensus evaluations and a plurality of cyber threat analyst ratings, and an application stored in the memory. When executed by the computer, the application generates a cyber threat report that identifies of a cyber threat intent and a cyber threat technology, receives from a cyber threat analyst an input of a cyber threat frequency score, an input of a cyber threat likelihood score, and an input of a cyber threat capability score, and generates a cyber threat intensity based on the scores and based on a cyber threat analyst rating stored in the data store and associated with the cyber threat analyst inputting the scores, whereby the cyber threat report and the cyber threat intensity are used to select cyber risk mitigation actions to economically manage the cyber risk of an enterprise or organization.

23 Claims, 6 Drawing Sheets

(56) References Cited

U.S. PATENT DOCUMENTS

| | | |
|---|---|---|
| 7,552,480 B1 | 6/2009 | Voss |
| 7,624,444 B2 | 11/2009 | Gupta et al. |
| 7,958,027 B2 | 6/2011 | Lawrence |
| 8,010,469 B2 | 8/2011 | Kapoor et al. |
| 8,091,065 B2 | 1/2012 | Mir et al. |
| 8,132,260 B1 | 3/2012 | Mayer et al. |
| 8,135,657 B2 | 3/2012 | Kapoor et al. |
| 8,250,651 B2 | 8/2012 | Huang et al. |
| 8,272,053 B2 | 9/2012 | Markham et al. |
| 8,375,450 B1 | 2/2013 | Oliver et al. |
| 8,438,644 B2 | 5/2013 | Watters et al. |
| 8,494,974 B2 | 7/2013 | Watters et al. |
| 8,813,050 B2 | 8/2014 | Watters et al. |
| 9,015,846 B2 | 4/2015 | Watters et al. |
| 2003/0009699 A1 | 1/2003 | Gupta et al. |
| 2003/0051026 A1 | 3/2003 | Carter et al. |
| 2003/0056116 A1 | 3/2003 | Bunker et al. |
| 2003/0097588 A1 | 5/2003 | Fischman et al. |
| 2003/0177376 A1 | 9/2003 | Arce Velleggia et al. |
| 2003/0233319 A1 | 12/2003 | Lawrence |
| 2005/0149348 A1 | 7/2005 | Baum-Waidner |
| 2005/0210275 A1 | 9/2005 | Homing et al. |
| 2006/0015941 A1 | 1/2006 | McKenna |
| 2006/0031940 A1 | 2/2006 | Rozman et al. |
| 2006/0059557 A1 | 3/2006 | Markham et al. |
| 2006/0080637 A1 | 4/2006 | Treit et al. |
| 2006/0117386 A1 | 6/2006 | Gupta et al. |
| 2006/0191007 A1 | 8/2006 | Thielamay |
| 2007/0006315 A1 | 1/2007 | Bushnaq |
| 2007/0100642 A1 | 5/2007 | Paulus et al. |
| 2007/0113281 A1 | 5/2007 | Leach |
| 2007/0169194 A1* | 7/2007 | Church .............. G06F 21/552 726/23 |
| 2007/0180522 A1 | 8/2007 | Bagnall |
| 2007/0180525 A1 | 8/2007 | Bagnall |
| 2007/0186284 A1 | 8/2007 | McConnell |
| 2007/0192859 A1 | 8/2007 | Shahar et al. |
| 2007/0192867 A1 | 8/2007 | Miliefsky |
| 2007/0240217 A1 | 10/2007 | Tuvell et al. |
| 2007/0240218 A1 | 10/2007 | Tuvell et al. |
| 2007/0250441 A1 | 10/2007 | Paulsen et al. |
| 2007/0251988 A1 | 11/2007 | Ahsan et al. |
| 2007/0277241 A1 | 11/2007 | Repasi et al. |
| 2008/0028470 A1 | 1/2008 | Remington et al. |
| 2008/0082380 A1 | 4/2008 | Stephenson |
| 2008/0196104 A1 | 8/2008 | Tuvell et al. |
| 2008/0301051 A1 | 12/2008 | Stahlberg |
| 2009/0099885 A1 | 4/2009 | Sung et al. |
| 2009/0128628 A1 | 5/2009 | Reinitz et al. |
| 2009/0150442 A1 | 6/2009 | Barnard et al. |
| 2009/0178139 A1 | 7/2009 | Stute et al. |
| 2009/0198641 A1 | 8/2009 | Tortoriello |
| 2009/0300589 A1 | 12/2009 | Watters et al. |
| 2010/0235918 A1 | 9/2010 | Mizrahi et al. |
| 2011/0173699 A1 | 7/2011 | Figlin et al. |
| 2011/0252479 A1* | 10/2011 | Beresnevichiene . H04L 63/1433 726/25 |
| 2012/0072983 A1 | 3/2012 | McCusker et al. |
| 2012/0096558 A1 | 4/2012 | Evrard |
| 2012/0180133 A1 | 7/2012 | Al-Harbi et al. |
| 2013/0018796 A1 | 1/2013 | Kolhatkar et al. |
| 2013/0232577 A1 | 9/2013 | Watters et al. |
| 2013/0282426 A1 | 10/2013 | Watters et al. |
| 2014/0297494 A1 | 10/2014 | Watters et al. |
| 2015/0096023 A1 | 4/2015 | Mesdaq et al. |
| 2016/0241580 A1 | 8/2016 | Watters et al. |
| 2016/0323295 A1 | 11/2016 | Joram et al. |

OTHER PUBLICATIONS

Watters, John P., et al., Patent Application entitled, "Electronic Crime Detection and Tracking," filed Jun. 18, 2014, U.S. Appl. No. 14/308,686.

Notice of Allowance dated May 13, 2014, U.S. Appl. No. 12/132,327, filed Jun. 3, 2008.

Foreign Communication From a Related Counterpart Application—International Preliminary Report on Patentability, PCT/US2009/042006, Dec. 6, 2012, 8 pages.

Watters, John P., et al., Patent Application entitled, "System and Method of Cyber Threat Structure Mapping and Application to Cyber Threat Mitigation", filed Apr. 3, 2014, U.S. Appl. No. 14/244,884.

Office Action dated May 3, 2012, U.S. Appl. No. 12/132,327, filed Jun. 3, 2008.

Final Office Action dated Aug. 8, 2012, U.S. Appl. No. 12/132,327, filed Jun. 3, 2008.

Office Action dated Jan. 23, 2014, U.S. Appl. No. 12/132,327, filed Jun. 3, 2008.

Office Action dated Aug. 8, 2012, U.S. Appl. No. 13/042,066, filed Mar. 7, 2011.

Notice of Allowance dated Jan. 10, 2013, U.S. Appl. No. 13/042,066, filed Mar. 7, 2011.

Foreign Communication From a Related Counterpart Application—European Office Action dated Nov. 27, 2103, European Application No. 12158396.7, Apr. 6, 2012, 5 pages.

Office Action dated Jul. 3, 2012, U.S. Appl. No. 12/689,160, filed Jan. 18, 2010.

Notice of Allowance dated Dec. 24, 2012, U.S. Appl. No. 12/689,160, filed Jan. 18, 2010.

Foreign Communication From a Related Counterpart Application—International Search Report and Written Opinion, PCT/US2009/042006, Jun. 19, 2009, 11 pages.

Foreign Communication From a Related Counterpart Application—European Search Report, European Application No. 12158396.7, Apr. 6, 2012, 6 pages.

Stewart, Joe, "Truman—The Reusable Unknown Malware Analysis Net," SecureWorks, Version 2, Jun. 1991, 1 page.

Wikipedia, "Bayesian Inference," http://en.wikipedia.org/w/index.php?title=Bayesian_inference&printable=yes, May 15, 2008, 12 pages.

Wikipedia, "Botnet," http://en.wikipedia.org/w/index.php?title=Botnet&printable=yes, May 11, 2008, 6 pages.

Notice of Allowance dated Feb. 20, 2015, U.S. Appl. No. 13/862,373, filed Apr. 12, 2013.

Pre-Interview Communication dated Nov. 2, 2016, U.S. Appl. No. 13/850,296, filed Mar. 26, 2013.

Pre-Interview Communication dated Sep. 29, 2016, U.S. Appl. No. 14/244,884, filed Apr. 3, 2014.

Office Action dated Apr. 5, 2017, U.S. Appl. No. 14/308,686, filed Jun. 18, 2014.

Foreign Communication From a Related Counterpart Application—European Notice of Intention to Grant dated Nov. 7, 2016, European Application No. 12158396.7, Apr. 6, 2012, 5 pages.

Foreign Communication From a Related Counterpart Application—European Decision to Grant dated Apr. 13, 2017, European Application No. 12158396.7, Apr. 6, 2012, 5 pages.

FAIPP Office Action dated Mar. 10, 2017, U.S. Appl. No. 13/850,296, filed Mar. 26, 2013.

FAIPP Office Action dated Mar. 6, 2017, U.S. Appl. No. 14/244,884, filed Apr. 3, 2014.

Notice of Allowance dated Apr. 26, 2017, U.S. Appl. No. 14/244,884, filed Apr. 3, 2014.

Office Action dated Mar. 10, 2017, U.S. Appl. No. 14/698,534, filed Apr. 28, 2015.

* cited by examiner

SYSTEM AND METHOD OF CYBER THREAT INTENSITY DETERMINATION AND APPLICATION TO CYBER THREAT MITIGATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Corporations and other organizations are vulnerable to a variety of threats. If a threat is actualized in the form of an attack, the organization may lose considerable value. Attacks can result in a direct loss of money, loss of confidential information which later can be monetized, loss of infrastructure availability, loss of data integrity, loss of customer confidence, loss of brand value, and other losses. Attacks may take a variety of forms including, but not limited to, employee theft, embezzlement, robbery, sabotage, infection with computer viruses, compromised credit card accounts, database invasions, and others. As tactics for thwarting and parrying attacks are developed and implemented by organizations, new attacks are devised and attempted by bad actors. Cybercrime and/or computer-based crime is becoming increasingly important as more value is aggregated in electronic artifacts such as financial accounts and databases.

SUMMARY

In an embodiment, a security system is disclosed. The system comprises a computer system, a memory accessible to the computer system, a data store comprising a plurality of consensus evaluations and a plurality of cyber threat analyst ratings, and an application stored in the memory. When executed by the computer system, the application generates a cyber threat report based on user inputs, wherein the report comprises an identification of a cyber threat intent and the identification of a cyber threat technology and receives from a cyber threat analyst an input of a cyber threat frequency score associated with a set of cyber threat intelligence, an input of a cyber threat likelihood score associated with the set of cyber threat intelligence, and an input of a cyber threat capability score associated with the set of cyber threat intelligence. The application further generates a cyber threat intensity based on the cyber threat frequency score, based on the cyber threat likelihood score, based on the cyber threat capability score, and based on a cyber threat analyst rating stored in the data store and associated with the cyber threat analyst inputting the scores. The cyber threat report and the cyber threat intensity may be used to select cyber risk mitigation actions to economically manage the cyber risk of an enterprise or organization.

In an embodiment, a method of mitigating cybercrime risk is disclosed. The method comprises evaluating a scoring accuracy of a cyber threat analyst to score a cyber threat frequency, a cyber threat likelihood, and a cyber threat capability based on an evaluation set of cyber threat intelligence. The method further comprises receiving from the cyber threat analyst an input of a cyber threat frequency score associated with a set of cyber threat intelligence, an input of a cyber threat likelihood score associated with the set of cyber threat intelligence, and an input of a cyber threat capability score associated with the set of cyber threat intelligence. The method further comprises determining a cyber threat intensity based on the cyber threat frequency score, on the cyber threat likelihood score, and on the cyber threat capability score associated with the set of threat intelligence and based on the scoring accuracy of the cyber threat analyst and deploying at least one electronic countermeasure to mitigate a cybercrime risk associated with the set of cyber threat intelligence based at least in part on the cyber threat intensity.

In an embodiment, a method of mitigation cybercrime risk is disclosed. The method comprises determining a cyber threat intensity based on a cyber threat frequency score, on a cyber threat likelihood score, and on a cyber threat capability score associated with a set of threat intelligence and based on a scoring accuracy of the cyber threat analyst. The method further comprises determining a potential impact on an enterprise based on a match between a threat intent associated with the set of threat intelligence and a predetermined potential business effect, based on a match between a technology associated with the set of threat intelligence and a technology deployed in the enterprise. The method further comprises determining a maximum monetary loss associated with a cybercrime, determining a cybercrime risk as proportional to the product of the cyber threat intensity multiplied by the potential impact on the enterprise multiplied by the maximum monetary loss associated with the cybercrime, and deploying at least one electronic or procedural control or countermeasure to mitigate the cybercrime risk, where the at least one electronic counter measure is selected based on the cybercrime risk.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A risk may be determined as a probable monetary loss, for example a monetary loss experienced by an enterprise or business as a result of a cybercrime. Based on the probable monetary loss and based on other information related to a potential cybercrime, an enterprise or organization may select and deploy controls and/or countermeasures to reduce the probable monetary loss or risk. A cybercrime may be a crime that is enacted using electronic communication links and/or using electronic computer systems. A cybercrime may comprise one or more of a denial of service (DOS) attack that may reduce the revenues that an on-line retailer may generate from a web site, a theft of credit card numbers and/or authentication tokens that may result in fraudulent charges to credit cards and financial losses to individuals and/or credit card institutions, or an unauthorized intrusion into a confidential information system to access and/or download confidential information such as personal medical records. A cybercrime may comprise one or more forms of corporate espionage, such as stealing customer lists, stealing sensitive business plans, stealing confidential technical information, and stealing other business information. One skilled in the art of cyber security will understand that cybercrime takes many more forms than this short list of examples.

The risk of monetary loss may be determined based on a calculated threat intensity and a potential impact on an enterprise or organization. For example, the risk of monetary loss may be determined by multiplying a maximum potential monetary loss by a coefficient calculated based on the threat intensity and based on a potential impact, where the coefficient is calculated to have a value in the range from 0 to about 1.0. As taught herein, the threat intensity may be calculated based on a subjective evaluation by a cyber threat analyst of one or more of a threat frequency, a threat likelihood, and a threat capability associated with a cyber threat. In an embodiment, the threat frequency and threat likelihood may be combined in a single combined threat intensity component, and the threat intensity may be calculated based on the combined threat intensity component and the threat capability component. In the future, other threat intensity components may be used to calculate the threat intensity in addition to those components identified above. The threat intensity may be constrained to a value in the range from 0 to about 1.0. Alternatively, the threat intensity may be constrained to a value in the range from 0 to about 5.0. Alternatively, the threat intensity may be constrained to some other value range. The cyber threat analyst is provided training and/or coached to learn to subjectively evaluate, assess, estimate, or score threat frequency, threat likelihood, and threat capability, which may be referred to generally as threat intensity components. This training is directed to adapting the cyber threat analyst's scores to agree with a consensus or standard scoring made by expert, veteran, and/or senior cyber threat analysts.

Generally, threat frequency is a subjective measure of the prevalence of a cyber threat; threat likelihood is a subjective measure of the probability that the cyber threat will be manifested against a business sector, a corporation or other organization; and threat capability is a subjective measure of the strength of a threat perpetrator, a malware tool, and/or a technology used to actualize the cyber threat. In an embodiment, the threat frequency may take into account a period of time associated with the threat intensity, for example a period of a year.

As part of the training process, the cyber threat analyst's skill in scoring threat intensity components may be evaluated to determine one or more accuracy metrics for the analyst. The analyst may score a plurality of sets of cyber threat intelligence and provide evaluations of threat intensity components of each of the sets of cyber threat intelligence, for example 5 different sets of cyber threat intelligence, 10 different sets of cyber threat intelligence, 20 different sets of cyber threat intelligence, or some other number of different sets of cyber threat intelligence. The scores determined by the analyst may then be compared with standard scores determined by expert scorers to determine a scoring accuracy of the analyst.

In an embodiment, the accuracy of the cyber threat analyst may be determined based on the average of the absolute value of the difference between the analyst's score and the standard score for a plurality of sets of cyber threat intelligence. This average may be divided by the average of the standard scores to scale the accuracy. The accuracy may be expressed in a variety of ways as discussed further hereinafter.

In an embodiment, some of the analyst's scoring efforts may be eliminated from the accuracy assessment. For example, the worst 10% of the analyst's scoring efforts (where worst means most divergent from the standard scoring) may be eliminated from the accuracy assessment. Alternatively, the worst and the best of the analyst's scoring efforts may be eliminated from the accuracy assessment. For example the best 10% of the analyst's scoring efforts (where best means most similar to the standard scoring) and the worst 10% of the analyst's scoring efforts may be eliminated from the accuracy assessment.

The same analyst may be assessed to have different accuracies for scoring different threat intensity components. For example, the first analyst may be evaluated to have a first accuracy when scoring frequency, a second accuracy when scoring threat likelihood, and a third accuracy when scoring threat capability. In an embodiment, the cyber threat analyst may periodically undergo retraining and/or recalibration to maintain or improve his or her evaluation accuracy and to keep the accuracy metric or metrics of the analyst current.

It is thought that cyber threat analysts may be better able to assess these particular threat intensity components. It is thought, for example, that if too many separate factors are identified and scored separately, this may reduce the accuracy of analysts' threat intensity scoring and/or make coaching analysts to score threat intensity consistent with scores made by veterans and/or senior cyber threat analysts less successful. For like reasons, the range of scores for individual threat intensity components may be restricted to integer values in a range from 1 to 5, in a range from 0 to 5, or to some other range. Alternatively, the range of scores for threat intensity components may be restricted to non-integer values between 1 to 5.0, from 0 to 5.0, or to some other non-integer range of value. In an embodiment, the threat likelihood and threat frequency components of threat intensity may be combined in some way, based on the rationale that these two components may not be sufficiently independent of each other.

Cyber threat intelligence may come from a variety of sources. The cyber threat analyst generates a report that summarizes and aggregates cyber threat intelligence that is related; for example the intelligence may relate to a specific cybercrime that has been reported by law enforcement and may include information about a target of the attack, software tools used in the attack, the specific technology that was targeted by the attack, etc. From the report, the cyber threat analyst may generate the assessment of threat frequency, threat likelihood, and threat capability as described above.

The cyber threat analyst may further populate values into a cyber threat progression (CTP) vector based on the report. A cyber threat progression may be a sequence of separate steps that are taken in carrying out a cyber attack. For example, an attack may include reconnaissance of a target network to determine attackable vulnerabilities, creating a custom malware to exploit that vulnerability, and other steps. The idea of a threat progression or a threat chain has been analyzed in a military context where combat tactics may be directed against specific elements in the chain to interdict the entire chain. The threat progression in that military context may comprise reconnaissance, weaponization, delivery, exploitation, installation, command and control, and actions on objectives. The cyber threat progression as described herein comprises those elements but additionally may comprise collections, monetization, and laundering chain elements that are not germane in a military situation.

In an embodiment, an exhaustive list of possible steps or phases that may be enacted during a cyber attack may be determined and a CTP vector defined comprising a separate value for each of the possible steps, where the value is either present or not present. Thus, for a given cyber attack, a selection of the exhaustive list of possible steps are determined to be present in the subject attack and are given a value of present (or the value of or the value of 'true' or the like) and the other steps that are not present in the subject cyber attack are given the value of not present (or the value of '0' or the value of 'false' or the like). It is an insight of the inventors and of this disclosure that, at least in some circumstances, a cybercrime having a specific cyber threat progression, as represented by a populated CTP vector, may effectively be attenuated by interdicting the threat merely at a single step in the cyber threat progression, for example by implementing a control and/or countermeasure that is effective to combat the subject step in the cyber threat progression.

The cyber threat analyst may further define a threat intent and a threat technology list based on the report. A threat intent may indicate an end goal or object of the cyber threat—for example to sell stolen credit card numbers. The threat intent may be selected from a predefined threat intent dictionary that exhaustively lists all identified threat intents. It is understood that the threat intent dictionary may evolve and be extended over time as new threat intents are identified. A threat technology list may be a list of technologies that the cyber threat targets, for example a specific version of a widely used email software package that has a security vulnerability. While only one example is given here, it may be that two or more technologies are targeted and/or vulnerable to the subject cyber threat. The threat technology list may be composed using threat technologies selected from a predefined threat technology dictionary that exhaustively lists all identified technologies. The threat technology dictionary may be extended as new technologies and/or new versions of technologies are deployed. It is understood that the threat technology dictionary may select technologies to include based on various factors such as a degree of adoption of a technology by a customer base, a frequency of use of a technology, a connection of a technology with known cyber attack strategies, and other selection criteria. The cyber threat analyst may perform the tasks described above using one or more software tools executing on a computer system, for example a work station, as described further hereinafter.

The cyber threat information generated by a cyber threat analyst described above may be used in an enterprise system and/or an organization system to assess its exposure to cybercrime. The enterprise may assess the potential business effects (PBEs) of cyber attacks being practiced on the computer and/or communication systems of the enterprise. In an embodiment, the potential business effects are aligned with a comprehensive list of threat intents (e.g., the threat intent dictionary) identified by a cyber security partner, for example a vendor that contracts with the enterprise to provide cyber security consulting services. Thus, an enterprise risk analyst may identify potential business effects based on review of the comprehensive list of possible cyber threat intents and analyzing which of those cyber threat intents the enterprise may be susceptible to. The enterprise risk analyst may also identify or maintain a data store identifying the technologies that the enterprise deploys. This may include identifying email software versions deployed on computers of employees of the enterprise, identifying firewall software versions deployed at communications portals of the enterprise, identifying password login software versions, and other technologies. The enterprise risk analyst may identify potential business effects and a list of technologies deployed by the enterprise before receiving specific cyber threat information.

When the enterprise risk analyst receives specific cyber threat information, the enterprise risk analyst may quantify a potential impact of the cyber threat on the enterprise. The specific cyber threat information may be received from a cyber threat analyst of a cyber security partner. The cyber threat information may comprise one or more of a quantitative assessment of the threat intensity, a CTP vector populated with values, an identification of one or more threat intents, and an identification of one or more threatened technologies. The enterprise risk analyst may first determine if the one or more threat intents match at least one potential business impact and if the one or more threatened technologies identified in the cyber threat information match at least one technology that the enterprise has deployed. If both matches are not present, the enterprise risk analyst may deem the cyber threat information not applicable to his enterprise and discontinue further analysis of the cyber threat information.

If, however, both matches are present, the enterprise is at least theoretically vulnerable to the subject cyber threat, and the enterprise risk analyst then quantifies the potential impact of the cyber threat on the enterprise. The potential impact may be constrained to a value in the range from 0 to about 1.0. Alternatively, the potential impact may be constrained to a value in the range from 0 to about 5.0. Alternatively, the potential impact may be constrained to a value in a different range of values.

The monetary risk associated with the specific cyber threat information may be calculated, as indicated above, based on multiplying a maximum potential monetary loss by a coefficient calculated based on the threat intensity and on the potential impact. This coefficient may be constrained to a value in the range 0 to 1.0. The monetary risk can be understood to be a probable monetary risk, given the facts on which the threat intensity and the potential impact are calculated.

It is thought that clearly conceptualizing the monetary risk in the way described above provides a plurality of possible benefits. The deterministic method used may promote buy-in by stakeholders within the enterprise, because the stakeholders can feel confident that the numbers are not fudged, manipulated, or fuzzy—the stakeholders can feel that there is a rationale behind the numbers. Clearly conceptualizing the monetary risk may provide a basis for evaluating and/or justifying how much money should be spent to reduce the risk. For example, if the monetary risk is $50 M, a Vice President of Information Security at the enterprise may be able to effectively champion investing $5 M in a suite of controls and/or countermeasures that reduce that monetary risk, after a second iteration of the calculation taking the controls and/or countermeasures into consideration, to $25 M. Without a deterministic, rational process, it may be that those responsible for allocating budgets would think the projections of monetary loss were just smoke and mirrors, a case of crying wolf, and refuse the allocation of the desired funds for controls and/or countermeasures.

In some contexts, controls may be understood to be risk mitigations that are in place or put in place to reduce risk as a whole. Countermeasures, in some contexts, may be understood as specific actions taken that are specific to a specific attack or attacks. Controls can be thought of as tending towards being static while countermeasures can be thought of as tending towards more dynamic responses to cyber attacks. Controls and/or countermeasures may be effected using electronic means, for example by software executing on computer systems. Alternatively, controls and/or countermeasures may be effected by procedural, manual, human actions, for example by being vigilante to avoid being duped by a phishing attack. To some extent, the term countermeasures may be used to cover both controls and countermeasures.

The CTP vector values associated with the subject cyber threat information may be used to choose specific controls and/or countermeasures. For example, it may be that it is judged sufficient to deploy one controls and/or countermeasure that is deemed 100% effective to interdict the cyber threat at one single point of the cyber threat progression. Alternatively, it may be judged sufficient to deploy two different controls and/or countermeasures each deemed about 85% effective to interdict the cyber threat at one single point of the cyber threat progression. Alternatively, it may be judged sufficient to deploy two different controls and/or countermeasures to interdict the cyber threat at a first point of the cyber threat progression and to deploy two other different controls and/or countermeasures to interdict the cyber threat at a second point of the cyber threat progression. In each of these examples, the use of the insight provided by the CTP vector can promote efficient and effective attenuation of the probable monetary loss.

After a controls and/or countermeasure is applied, one or more of the threat intensity components may be rescored based on the newly deployed controls and/or countermeasures. For example, the threat likelihood score may change based on the newly deployed controls and/or countermeasures. The threat intensity and the monetary risk can be recalculated. An analysis may be performed comparing the monetary risk after deployment of the controls and/or countermeasures with the monetary risk determined before the deployment of the controls and/or countermeasures to determine a cost effectiveness of the deployment of the controls and/or countermeasures. In an embodiment, a software analysis tool may be used to compare the cost effectiveness and/or the impact on monetary risk of deploying different controls and/or countermeasures and/or combinations of controls and/or countermeasures, whereby to determine an efficient cyber threat risk mitigation response to a given set of cyber threat intelligence.

Figure 1:
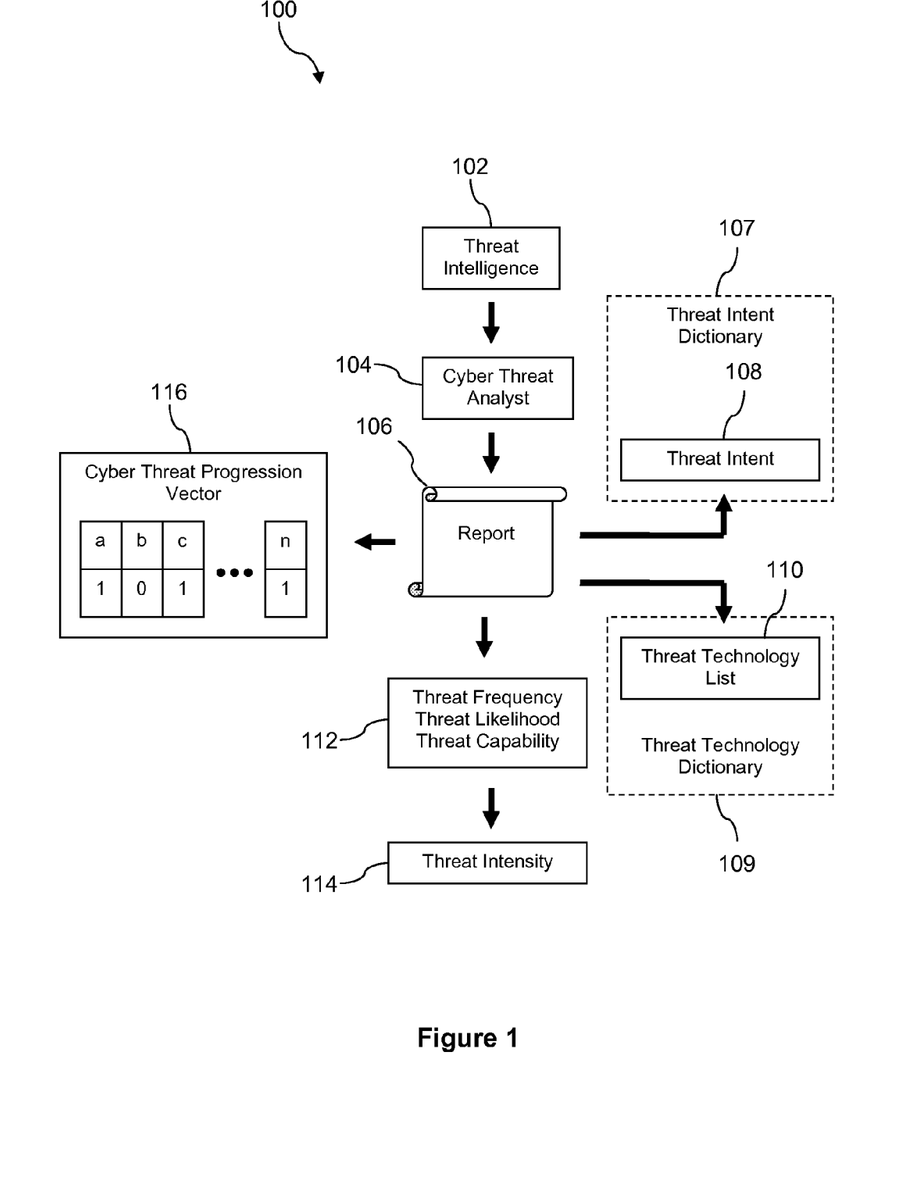
FIG. 1 is an illustration of a cyber threat analysis flow according to an embodiment of the disclosure.

Turning now to FIG. 1, a cyber threat analysis flow 100 is described. The analysis flow 100 comprises threat intelligence 102 being received by a cyber threat analyst 104 who generates therefrom a threat report 106. The threat intelligence 102 may come from one or more of a variety of sources. The threat intelligence 102 may be provided in a report on a cybercrime investigated by law enforcement. The threat intelligence 102 may be provided by another enterprise, for example information shared among a group of enterprises that have agreed to pool information on cybercrimes in order to better secure their businesses from future cyber threats. The threat intelligence 102 may be developed by cyber threat analysts who monitor web sites and/or blogs operated by cyber criminals. The threat report 106 may take any form. In an embodiment, the threat report 106 may be generated with a cyber threat report editor tool. This may be a commercially available word processing tool or it may be a specialized tool developed to meet the needs of generating the threat report 106. The cyber threat analyst 104 may generate a plurality of cyber threat artifacts that may promote convenient and/or rapid processing of the cyber threat information.

In an embodiment, the cyber threat analyst 104 may generate a plurality of quantitative assessments of threat intensity components 112, for example a quantitative assessment of threat frequency, a quantitative assessment of threat likelihood, and a quantitative assessment of threat capability. These quantitative assessments may also be referred to as scores and the actions of a cyber threat analyst in performing these quantitative assessments may be referred to as scoring. The quantitative assessments or scores may be considered to be subjective assessments or qualitative assessments.

Alternatively, in an embodiment, the cyber threat analyst 104 may generate a quantitative assessment of threat capability and a quantitative assessment of a probability of occurrence of the subject threat. The probability of occurrence may be conceptualized as a kind of combination or aggregation of the concept of threat likelihood and the concept of threat frequency. The probability of occurrence, as likewise for the threat frequency, may be assessed taking into account a probability of the subject cyber threat being manifested during a period of time or a unit of time, for example during a given year. This approach may promote aligning the threat intensity and hence the probable monetary loss assessment to the annual budget process of an enterprise. In an embodiment, either the threat frequency and/or the probability of occurrence may be assessed taking into account any of a variety of periods of time, for example a quarter of a year, a half of a year, or some other period of time. The period of time may be aligned with some business plan period, for example a period extending from a round of venture capital funding to a planned initial public offering date for a startup company. The period of time may be aligned to a long term business strategy interval, for example aligned to a five year business plan.

It is understood that the scoring of the threat intensity components 112 may be associated with the accuracy attributed to the subject cyber threat analyst 104. For example, the assessments or scores of the threat intensity components 112 may be accompanied by separate accuracy figures of merit of the analyst for each of the threat intensity components 112. For example, the scores may be given as threat frequency=0.8 (accuracy 85%), threat likelihood=0.6 (accuracy 75%), and threat capability=0.9 (accuracy 95%). Alternatively, the scores of the threat intensity components 112 may incorporate the accuracy figure of merit of the cyber threat analyst. For example, the quantification may be given as threat frequency=0.8±0.12, threat likelihood=0.6±0.15, and threat capability=0.9±0.045. Alternatively, for example, the scores may be given as threat frequency=0.68 to 0.92, threat likelihood=0.45 to 0.75, and threat capability=0.855 to 0.945. Alternatively, the threat intensity components 112 and the accuracy of the cyber threat analyst may be expressed in some other format.

A threat intensity 114 is calculated or determined based on the threat intensity components 112. The threat intensity 114 may be calculated to take a value in a constrained range, for example from 0 to about 1.0, from 0 to about 5.0, or some other constrained range. It is understood that the scores assigned by the cyber threat analyst 104 may be combined or processed in a variety of ways to calculate or determine the threat intensity 114. In an embodiment, the threat intensity 114 may be determined as proportional to a linear combination of the threat intensity components 112, for example:

$$TI \propto a_1 C_1 + a_2 C_2 + \ldots + a_n C_n \qquad \text{EQ 1}$$

where TI is the threat intensity 114, where $C_1, C_2, \ldots, C_n$ are the scores of each of a plurality of threat intensity components 112 (there may be any number of components), and where $a_1, a_2, \ldots, a_n$ are the corresponding coefficients of the threat intensity components 112. In some contexts the coefficients 'a' may be referred to as weighting coefficients. The coefficients 'a' of the threat intensity components 112 may be chosen to limit the value of the linear combination to the appropriate constrained range of values. Alternatively, a separate step of calculation may force a negative value to a zero value and force a value greater than the range constraint to the upper boundary of the range constraint. In an embodiment, the threat intensity 114 may be determined to be proportional to a linear combination of the scores of the threat intensity components 112 plus an additive offset, for example:

$$TI = k(a_1 C_1 + a_2 C_2 + \ldots + a_n C_n) + b \qquad \text{EQ 2}$$

where k is a proportionality constant and b is an additive offset constant.

In another embodiment, the threat intensity components 112 may be conceived to be independent dimensions, and the threat intensity 114 may be calculated to be proportional to the distance or amplitude of the vector sum of the scores of these threat intensity components 112, for example:

$$TI \propto \sqrt{(a_1 C_2)^2 + (a_2 C_2)^2 + \ldots + (a_n C_n)^2} \qquad \text{EQ 3}$$

where TI is the threat intensity 114, where $C_1, C_2, \ldots, C_n$ are the scores of a plurality of threat intensity components 112 and where $a_1, a_2, \ldots, a_n$ are the corresponding coefficients of the threat intensity components 112. The threat intensity 114 may be restricted to a constrained range of values. For example, the result of the square root function may be multiplied by a scaling factor that restricts the value of the threat intensity 114 to the constrained range of values.

$$TI = \left( \frac{1}{\sqrt{a_1^2 + a_2^2 + \ldots + a_n^2}} \right) \sqrt{(a_1 C_2)^2 + (a_2 C_2)^2 + \ldots + (a_n C_n)^2} \qquad \text{EQ 4}$$

Other processes for determining the threat intensity 114 based on the scores of the threat intensity components 112 are also contemplated by the present disclosure. In an embodiment, the threat intensity 114 may be accompanied by a confidence value that is determined based on the accuracy of the cyber threat analyst 104. For example, the value of the threat intensity 114 may be calculated with the threat intensity components 112 increased to maximum values based on the accuracy of the cyber threat analyst 104 to determine a worst case threat intensity 114. The value of the threat intensity 114 may also be calculated with the threat intensity components 112 decreased to minimum values based on the accuracy of the cyber threat analysis 104 to determine a best case of threat intensity 114. This may lead, for example to expressing the threat intensity 114 as 3.0+/−0.2 or as 2.8 to 3.2 or as 3.0+/−6% or some other method.

The cyber threat analyst 104 may identify one or more cyber threat intents 108 associated with the threat intelligence 102. The cyber threat intent 108 may be selected from a comprehensive list of cyber threat intents that can be referred to as a threat intent dictionary 107. Composing and sharing an exhaustive list of threat intents in this way can promote harmonization of terminology among cyber threat analysts as well as among enterprises. The cyber threat intents may comprise a denial of service (DOS) intent, a credit card theft intent, a personal medical records theft intent, and others. In some contexts, the cyber threat intents 108 may be referred to simply as threat intents 108.

The cyber threat analyst 104 may identify one or more technologies to form a threat technology list 110 that are exploited by the cyber threat identified in the threat report 106 and/or in the threat intelligence 102, where the technologies are selected from a threat technology dictionary 109 or more simply a technology dictionary 109. The technologies may comprise electronic mail tools and/or applications and their version identity, firewall applications and their version identity, operating systems and their version identity, as well as other technologies. Composing and sharing an exhaustive list of threat intents 108 in a threat intent dictionary 107 and an exhaustive list of technologies in the threat technology dictionary 109 can promote harmonization of terminology among cyber threat analysts as well as among enterprises.

The cyber threat analyst 104 may further assign values to elements of a cyber threat progression vector 116. For example, for steps of the cyber threat progression that are determined to be part of the subject cyber threat, the associated value may be set to 'present,' '1,' 'true,' or some other value. For steps of the cyber threat progression that are determined to not be part of the subject cyber threat, the associated value may be set to 'not present,' '0,' or 'false.' In FIG. 1, the cyber threat progression vector 116 is illustrated as having a plurality of elements a, b, c, . . . n to suggest an indefinite number of elements. Each element is illustrated as having a value of '1' or '0,' hence a step of the cyber threat progression present in a given cyber threat or a step of the cyber threat progression absent in the given cyber threat.

Elements of the cyber threat progression vector 116 may comprise an element corresponding to capturing credit card numbers, an element corresponding to collecting credit card credentials, an element corresponding to deploying a cyber attack tool, an element corresponding to purchasing a cyber attack tool, an element corresponding to monetizing stolen credit card numbers, an element corresponding to laundering money or goods acquired through using stolen credit card numbers, and other elements.

Figure 2:
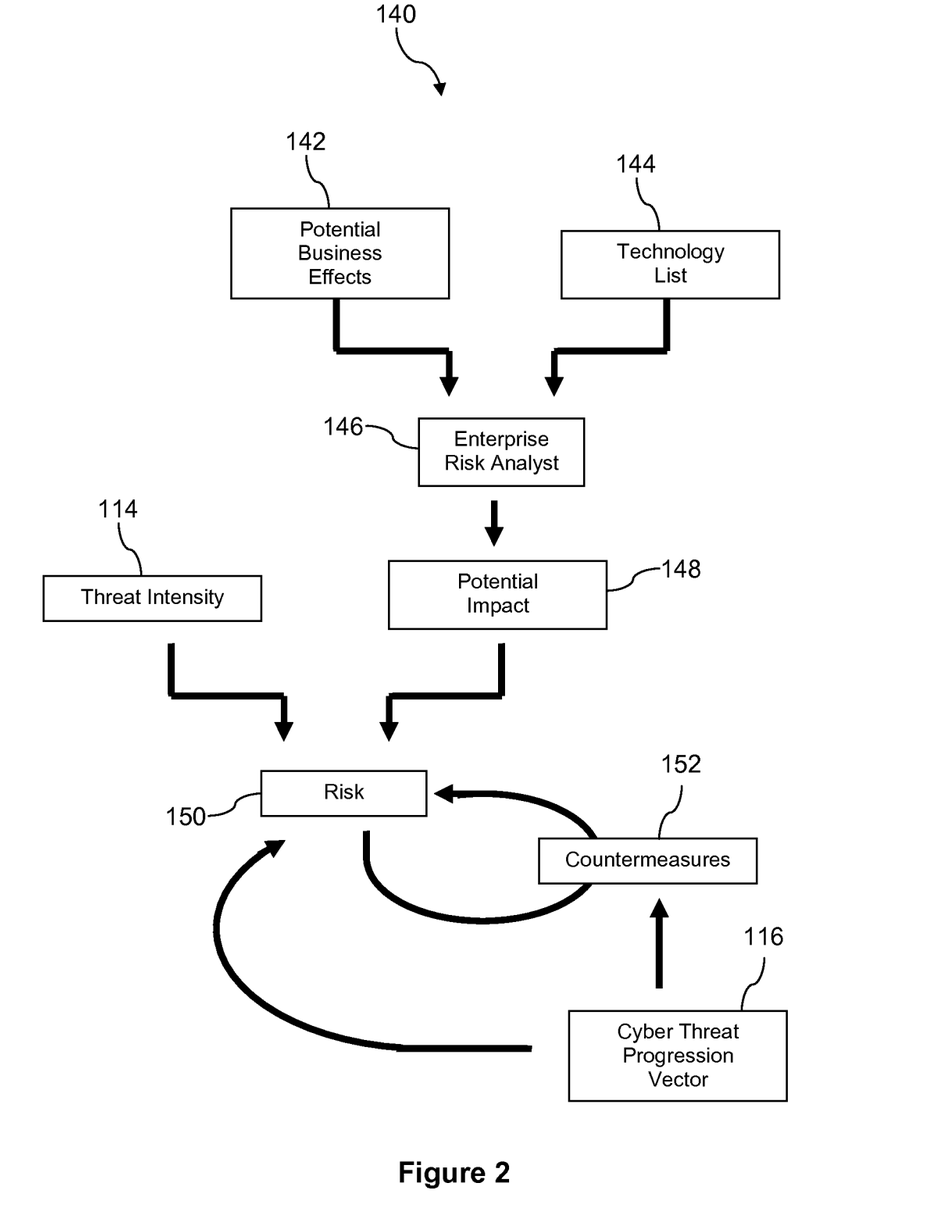
FIG. 2 is an illustration of a risk analysis flow according to an embodiment of the disclosure.

Turning now to FIG. 2, a risk analysis flow 140 is described. Potential business effects 142 may be enumerated for an enterprise or organization by selecting from the threat intent dictionary 107 generated by the cyber threat analyst 104. Thus, in an embodiment, the potential business effects 142 may be a sub-set of the threat intent dictionary 107. A technology list 144 may be prepared by an enterprise or organization listing all of the electronic and/or communication technologies the enterprise or organization uses. Generally, the contents of the technology list 144 is a subset of the contents of the threat technology dictionary 109. In an embodiment, the enterprise or organization may inform a cyber threat analyst or a cyber security consulting company of new vulnerable technologies as they are deployed within the enterprise or organization, and the new technologies may be added to the threat technology dictionary 109 as well as to the technology list 144. The potential business effects 142 and the technology list 144 may be determined and stored by an enterprise risk analyst 146 independently of and/or in advance of receiving any threat intelligence or threat report, for example stored in a data store.

It is understood that the risk analysis flow 140 may be performed and applied by a plurality of different enterprises and/or organizations, for example a plurality of independent customers of a cyber security consulting company that may perform and apply the cyber threat analysis flow 100. The potential business effects 142 and the technology list 144 developed by different enterprises and/or organizations may be different. When information is received by the enterprise risk analyst 146 about a cyber threat, for example in the form of one or more of the threat intensity 114, the cyber threat vector 116, a threat intent 108, and a threat technology list 110 associated with a threat report 106 and/or threat intelligence 102, the enterprise risk analyst 146 may quickly determine if the threat intent 108 matches any of the pre-identified potential business effects 142 and if the threat technology list 110 matches one or more of the pre-identified technology list 144. It is understood that a first enterprise, a second enterprise, and a third enterprise may receive the same threat report 106. The first and the third enterprise may determine that the threat intent 108 matches the potential business effects 142 identified by the first and third enterprise. The second enterprise may determine that the threat intent 108 does not match a potential business effect 142 identified by the second enterprise, and hence the second enterprise may not perform further analysis of the subject threat report 106. The first enterprise may determine that the threat technology list 110 matches the technology list 144 identified by the first enterprise. The third enterprise may determine that the threat technology list 110 does not contain a technology that is present in the technology list 144 identified by the third enterprise, and hence the third enterprise may not perform further analysis of the subject threat report 106. Based on the two matches—the match of the threat intent to the potential business impact and the match of at least one technology item in the threat technology list with a technology item in the technology list 144—the first enterprise, and other enterprises, may consider itself at least theoretically vulnerable to the cyber threat documented by the subject threat report 106 and continue the rest of the risk analysis flow 140.

Based on the cyber threat information available to the enterprise risk analyst 146, a potential impact 148 is determined. The potential impact 148 represents a normalized potential magnitude of the unmitigated effect on the enterprise or organization of the subject cyber threat manifesting itself against the electronic and/or communication systems of the enterprise or organization. It is to be noted that the potential impact 148 is determined based on the assumption that the subject cyber threat actually does in fact occur. The fractional probability of the manifestation of the subject cyber threat actually occurring is taken into account in a different way, based on the threat intensity 114 as discussed further below. In an embodiment, the potential impact may be a value constrained to a range from 0 to about 1.0. In another embodiment, however, the potential impact 148 is not a normalized value and instead represents the maximum monetary loss that the enterprise may realize in the worst case scenario. This value may be related to the associated potential business effect 142. Said in another way, some potential business effects 142 may have a greater maximum monetary loss associated with them than others.

A risk 150 represents the probable monetary loss to the enterprise or organization due to the subject cyber threat, e.g., the cyber threat identified in the threat intelligence 102. In an embodiment, the risk 150 represents the probable monetary loss to the enterprise or organization due to the subject cyber threat during an understood period of time, for example during a quarter of a year, a half year, a year, or some other period of time. The understood period of time may be aligned with or determined based on a business plan time interval, for example a time from a round of initial venture capital funding to an initial public offering of stock for a startup company or a time associated with a long term five year business strategy plan. The linkage of the risk 150 to a delimited period of time may be provided by the determination of the threat intensity 114 as described further above. The risk 150 may be represented in currency values, such as in US dollars, Euros, Yen, Rubbles, or other currencies. The risk 150 may be a normalized value from 0 to 1.0. The risk 150 may be calculated or determined by multiplying the threat intensity 114 with the potential impact 148. In the case that the potential impact 148 is a normalized value, the risk 150 may be calculated further based on a separate asset value multiplier.

The risk 150 may be expressed with an indication of the accuracy of the calculation, for example taking into account the accuracy of the cyber threat analyst 104 or plurality of cyber threat analysts 104 that generated the threat intensity components 112 that were used to determine the threat intensity 114. The accuracy may be expressed in a variety of ways. The accuracy may be expressed as a percentage of accuracy such as 90%, implying the deviation of the risk 150 is expected to be less than +/−10% of the risk 150. The accuracy may be expressed as a value, for example +/−$3 million. The accuracy may be expressed in another fashion.

If controls and/or countermeasures 152 are deployed to mitigate and/or attenuate the risk 150, the calculated value of the threat intensity 114 may be reduced, thereby reducing the probably monetary loss represented by the risk 150. The association of specific controls and/or countermeasures with the cyber threat progression vector 116 associated with the subject cyber threat feeds into the determination of the threat intensity 114 and hence into the risk 150. In an embodiment, the threat intensity 114 and the risk 150 may be redetermined multiple times using different assumptions or inputs of controls and/or countermeasures 152 that may be deployed to mitigate the risk 150.

Figure 3:
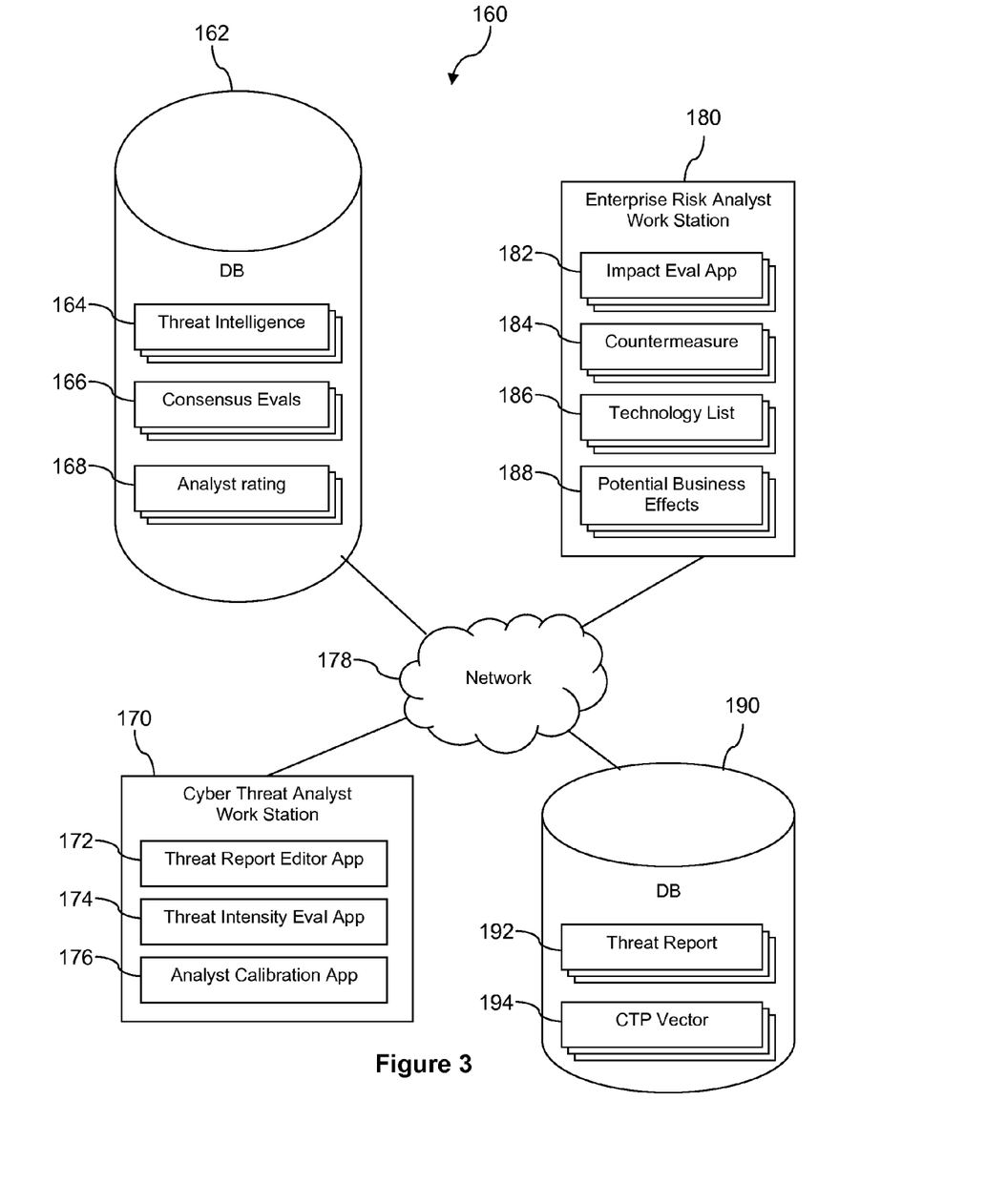
FIG. 3 is a block diagram of a cyber threat mitigation system according to an embodiment of the disclosure.

Turning now to FIG. 3, a cyber threat mitigation system 160 is described. In an embodiment, the system 160 comprises a first data store 162, a cyber threat analyst work station 170, a network 178, an enterprise risk analyst work station 180, and a second data store 190. While the description of the cyber threat mitigation system 160 takes the view that the view that the cyber threat analyst work station 170 may be operated by an analyst in a cyber security consulting company and the enterprise risk analyst work station 180 may be operated by an analyst in an enterprise, it is understood that the work stations 170, 180 may be operated by employees of the same enterprise or organization. The network 178 may be any combination of public and/or private communication networks, wired and/or wireless networks. While the first data store 162 is illustrated as separate and distinct from the second data store 190, in an embodiment the first and second data store 162, 190 may be combined in a single data store. In an embodiment, the separation of the first data store 162 from the second data store 190 may promote segregation of access. For example, in an embodiment, access to the first data store 162 may be restricted to cyber threat analysts associated with a cyber security consulting company, and access to the second data store 190 may be opened to allow access by the cyber threat analysts as well as enterprise risk analysts of one or more enterprises that collaborate with or pay to obtain the consulting services of the cyber security consulting company.

While one cyber threat analyst work station 170 and one enterprise risk analyst work station 180 are illustrated in FIG. 1, it is understood that the system 160 may comprise a plurality of cyber threat analyst work stations 170 and/or a plurality of enterprise risk analyst work stations 180. The work stations 170, 180 are computer systems. Computer systems are described further hereinafter. In an embodiment, the functionality described below as provided by the cyber threat analyst work station 170 may be provided by a server computer, and cyber threat analysts may login to the server computer or access functions hosted by the server computer via a remote interface, for example through a web interface or other interface. Likewise, the functionality described below as provided by the enterprise risk analyst work station 190 may be provided by a server computer, for example a server computer within the enterprise computer system, and the enterprise risk analyst may login to that server computer or access functions hosted by that server computer via a remote interface such as a web interface or other interface.

In an embodiment, the cyber threat analyst work station 170 (or corresponding server computer) comprises a threat report editor application 172, a threat intensity evaluation application 174, and a cyber threat analyst calibration application 176. The applications 172, 174, 176 may be implemented as software or other computer executable logic or programs. The cyber threat analyst calibration application 176 may be used to coach, train, and/or calibrate cyber threat analysts. For example, the application 176 may provide coaching sessions about how to score threat intensity components 112.

The application 176 further may lead a cyber threat analyst through a standard set of threat intelligence packages and quantitatively assessing and/or scoring the threat intensity components 112. The application 176 may then determine an accuracy of the scoring of threat intensity components 112 by the cyber threat analyst by comparing the cyber threat analyst's scoring to the standard quantitative assessments and/or scoring determined by a panel of expert assessors, of veteran assessors, or senior cyber threat analysts based on the same threat intelligence packages. In an embodiment, a cyber threat analyst may not be deemed ready to collaborate with and/or consult with enterprise clients until he or she has achieved a threshold amount of accuracy. The quantitative assessments, scores, and/or evaluations of the expert assessors may be stored as consensus evaluations 166 in the first data store 162. The scores by expert assessors may be referred to as standard scores in some contexts. The accuracy of cyber threat analysts may be stored as analyst ratings 168 in the first data store 162.

Threat intelligence 164, which may be generated from or be substantially equivalent to the threat intelligence 102 described above with reference to FIG. 1, may be stored in the first data store 162. The cyber threat analyst may read or view the threat intelligence 164 and use the threat report editor application 172 to generate the threat report 106. The threat report editor application 172 may also promote the definition of the cyber threat progression vector 116, the threat intent 108, and the threat technology list 110 associated with the subject threat intelligence 164. For example, new threat intelligence 164 may be received by the cyber security consulting firm, and a cyber threat analyst or a plurality of cyber threat analysts may be assigned to analyze the threat intelligence 164 and generate the threat analysis artifacts—for example the threat report 106, the cyber threat progression vector 116, the threat intent 108, and the threat technology list 110—using the threat report editor application 172. These artifacts or outputs of the threat analysis may be stored as a threat report 192 and a cyber threat progression (CTP) vector 194 in the second data store 190. In an embodiment, the cyber threat progression vector may be part of the threat report 192. In an embodiment, the threat intent 108 and the threat technology list 110 associated with the subject threat intelligence 164 may be incorporated in the threat report 192. Alternatively, the threat intent 108 and threat technology list 110 associated with the subject threat intelligence 164 may be stored separately in the second data store 190.

One or more cyber threat analysts 104 may also be assigned to quantify the threat intensity components 112 and to automatically generate the threat intensity 114 from those threat intensity components 112, for example using the threat intensity evaluation application 174. The threat intensity 114 may also be stored in the second data store 190. In an embodiment, the threat intensity 114 may be determined based on a plurality of scoring by different cyber threat analysts 104, for example taking an average of scoring for each threat intensity component 112 or by taking an average of the threat intensity 114 generated from the scoring of the threat intensity components 112 by individual cyber threat analysts 104.

The enterprise risk analyst work station 180 may comprise an impact evaluation application 182, a controls and/or countermeasures application 184, a technology list 186, and a list of potential business effects 188. In an embodiment, the technology list 186 may correspond to or be substantially similar to the technology list 144 described with reference to FIG. 2, and the potential business effects 188 may correspond to or be substantially similar to the potential business effects 142 described with reference to FIG. 2. The impact evaluation application 182 may be software and/or logic or a program that executes on the enterprise risk analyst work station 180 or on a server computer. The enterprise risk analyst 146 may use the impact evaluation application 182 to calculate the potential impact 148 based on the threat report 192, based on the association of the threat intent 108 of a subject threat report 192 (and hence of a subject cyber threat) to a potential business effect 142, and based on the association of the threat technology list 110 of the subject threat report 192 to a technology list 144 (e.g., technologies deployed by the enterprise).

The impact evaluation application 182 may also further calculate the cyber threat risk 150 based on the threat intensity 114 and the potential impact 148. For example, the cyber threat risk 150 may be calculated as the product of the threat intensity 114 with the potential impact 148. The cyber threat risk 150 may be calculated as the product of the threat intensity 114 with the potential impact 148 and with a scaling factor to adapt the cyber threat risk 150 to have an appropriate monetary value. The cyber threat risk 150 may be adapted to express the likely monetary loss of the enterprise due to the subject cyber threat given a predefined cyber security environment of the enterprise. The cyber threat risk 150 may be adapted to express the likely monetary loss of the enterprise due to the subject cyber threat in an understood time period, as described further above, given the predefined cyber security environment of the enterprise. The cyber security environment may comprise one or more controls and/or countermeasures 152 that are deployed to mitigate and/or attenuate the monetary risk of cybercrimes.

In an embodiment, there may be an iterative process involved in determining the cyber threat risk 150. For example, a first value of cyber threat risk 150 may be determined responsive to the initial reception of the threat intelligence 102 by the cyber security consultation firm. Based on the calculated cyber threat risk 150, the enterprise may justify a budget for controls and/or countermeasures to be deployed to attenuate and/or mitigate the cyber threat risk 150. Based on the changed cyber security environment of the enterprise (e.g., the cyber security environment has been adapted by deploying one or more controls and/or countermeasures 152 and has become less vulnerable to the subject cyber threat), the cyber threat risk 150 is recalculated. It may be that the second value of cyber threat risk 150 leads to justifying additional budget for controls and/or countermeasures 152 that would be deployed to attenuate and/or mitigate yet further the cyber threat risk 150. Further, additional intelligence relating to the cyber threat may be received, and this additional intelligence also may drive the threat report 106 to be adapted and the artifacts that the cyber threat analyst 104 develops from that adapted threat report 106 may likewise be adapted. For further information about cybercrime, quantifying and visualizing monetary risk associated with cybercrime, and the results on risk of deploying countermeasures see U.S. patent application Ser. No. 12/132,327 filed Jun. 3, 2008, entitled "Electronic Crime Detection and Tracking," by John P. Watters, et al; U.S. Pat. No. 8,494,974, issued Jul. 23, 2013, entitled "Targeted Security Implementation Through Security Loss Forecasting," by John P. Watters, et al; and U.S. Pat. No. 8,438,644, issued May 7, 2013, entitled "Information System Security Based on Threat Vectors," by John P. Watters, et al; all of which are incorporated by reference herein each in its entirety.

Figure 4:
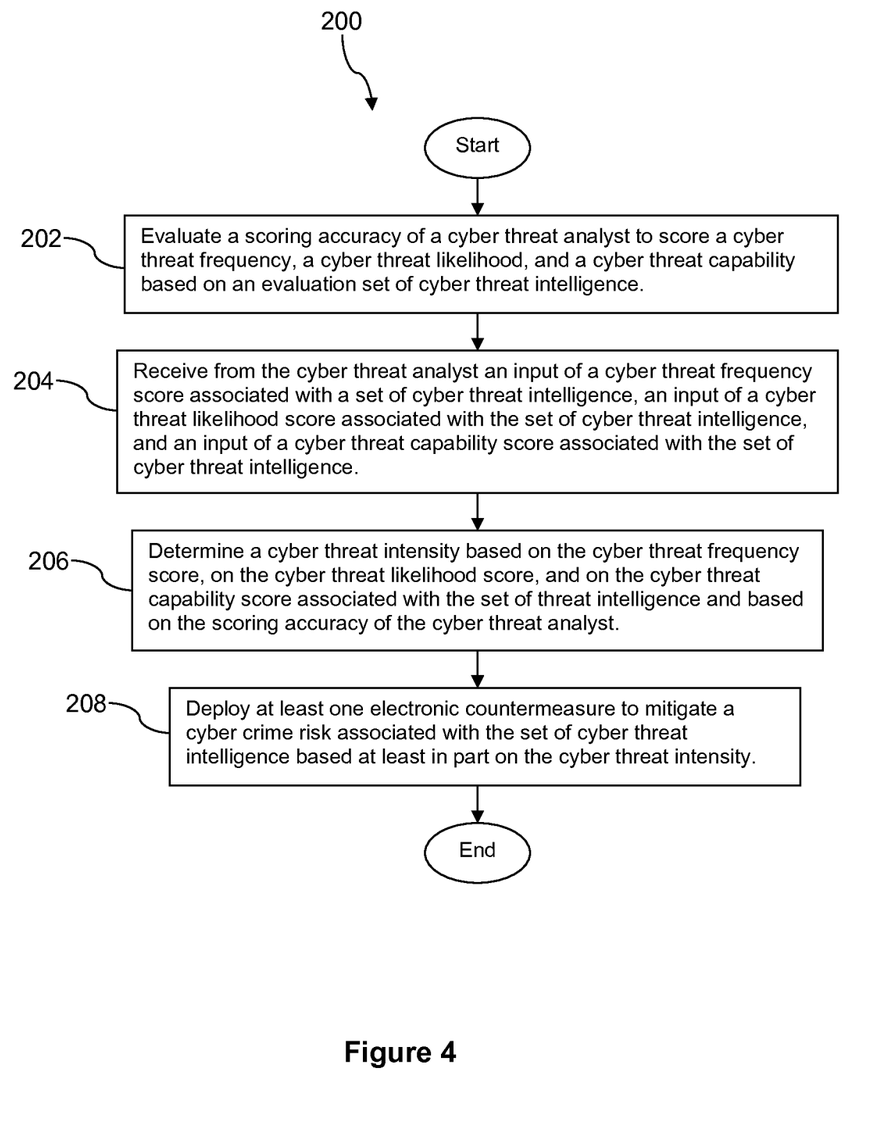
FIG. 4 is a flow chart of a method according to an embodiment of the disclosure.

Turning now to FIG. 4, a method 200 is described. At block 202, evaluate a scoring accuracy of a cyber threat analyst to score a cyber threat frequency, a cyber threat likelihood, and a cyber threat capability based on an evaluation set of cyber threat intelligence. For example, compare the scoring by the cyber threat analyst of threat intensity components 112 for each of a plurality of sets of threat intelligence 164 and compare the scores with standard scores or consensus scores of one or more expert scorers or evaluators for the same sets of threat intelligence 164. The scoring accuracy of the cyber threat analyst may be evaluated based on scoring of five sets of threat intelligence, based on scoring ten sets of threat intelligence, or based twenty sets of threat intelligence. In an embodiment, the scoring accuracy of the cyber threat analyst may be evaluated based on the best 80% of the cyber threat analyst's scorings, where "best" here means most consistent with the standard scores produced by the expert scorers.

At block 204, receive from the cyber threat analyst an input of a cyber threat frequency score associated with a set of cyber threat intelligence, an input of a cyber threat likelihood score associated with the set of cyber threat intelligence, and an input of a cyber threat capability score associated with the set of cyber threat intelligence. For example, receive the scoring of the threat intensity components 112 by the cyber threat analyst 104 based on the threat intelligence 102. In an embodiment, the cyber threat analyst 104 may use the threat report editor application 172 or another application that executes on the cyber threat analyst work station 170 to enter the scores.

At block 206, determine a cyber threat intensity based on the cyber threat frequency score, on the cyber threat likelihood score, and on the cyber threat capability score associated with the set of threat intelligence and based on the scoring accuracy of the cyber threat analyst. In an embodiment, the cyber threat intensity may be determined by the threat report editor application 172 or by another application that executes on the cyber threat analyst work station 170. The processing of block 206 may include defining weighting coefficients for the threat intensity components 112, for example using the threat report editor application 172 or other application, or this may have been completed or configured earlier. At block 208, deploy at least one electronic countermeasure or other countermeasure to mitigate a cybercrime risk associated with the set of cyber threat intelligence based at least in part on the cyber threat intensity. For example, deploy a countermeasure to reduce the risk 150.

Figure 5:
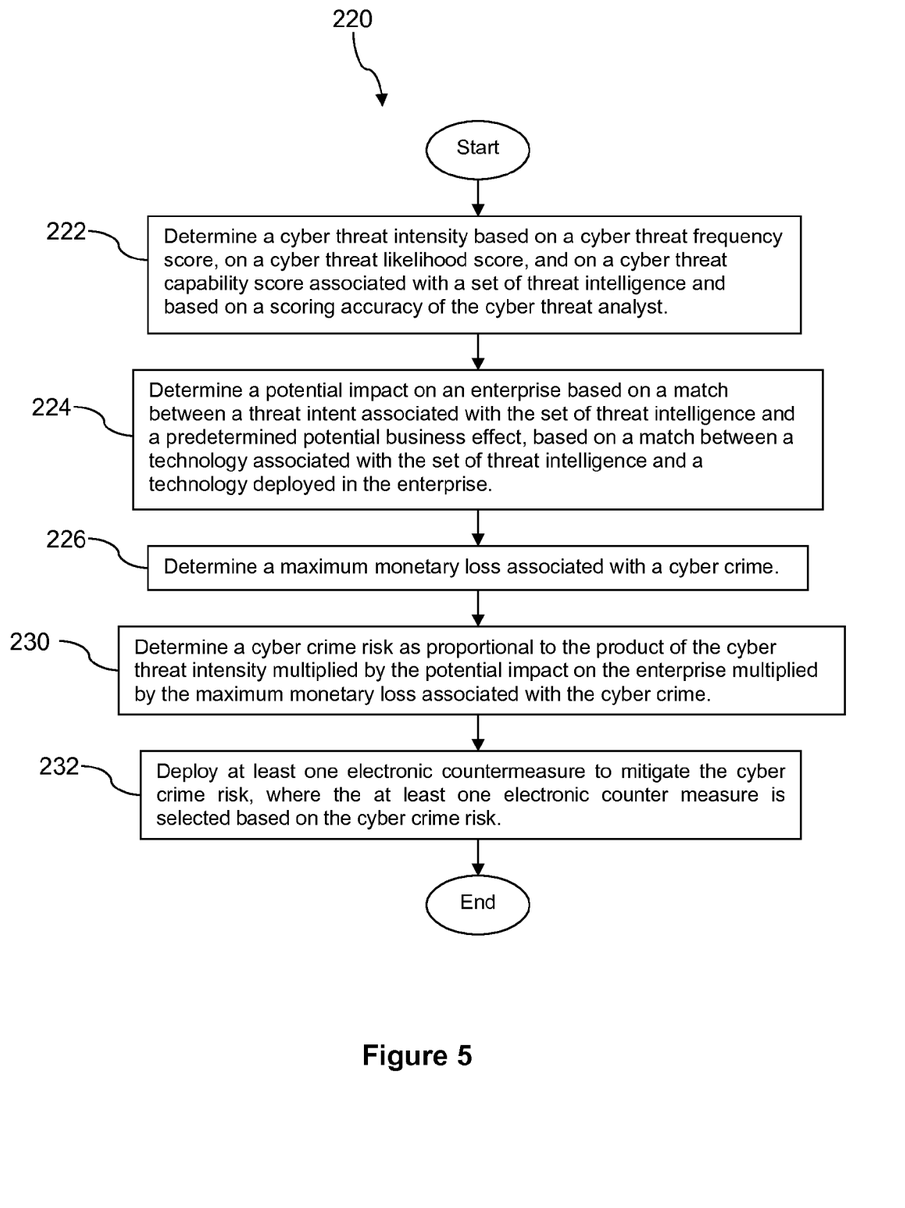
FIG. 5 is a flow chart of another method according to an embodiment of the disclosure.

Turning now to FIG. 5, a method 220 is described. At block 222, determine a cyber threat intensity based on a cyber threat frequency score, on a cyber threat likelihood score, and on a cyber threat capability score associated with a set of threat intelligence and based on a scoring accuracy of the cyber threat analyst. At block 224, determine a potential impact on an enterprise based on a match between a threat intent associated with the set of threat intelligence and a predetermined potential business effect, based on a match between a technology associated with the set of threat intelligence and a technology deployed in the enterprise.

At block 226, determine a maximum monetary loss associated with a cybercrime. At block 230, determine a cybercrime risk as proportional to the product of the cyber threat intensity multiplied by the potential impact on the enterprise multiplied by the maximum monetary loss associated with the cybercrime. At block 232, deploy at least one electronic countermeasure to mitigate the cybercrime risk, where the at least one electronic counter measure is selected based on the cybercrime risk.

Figure 6:
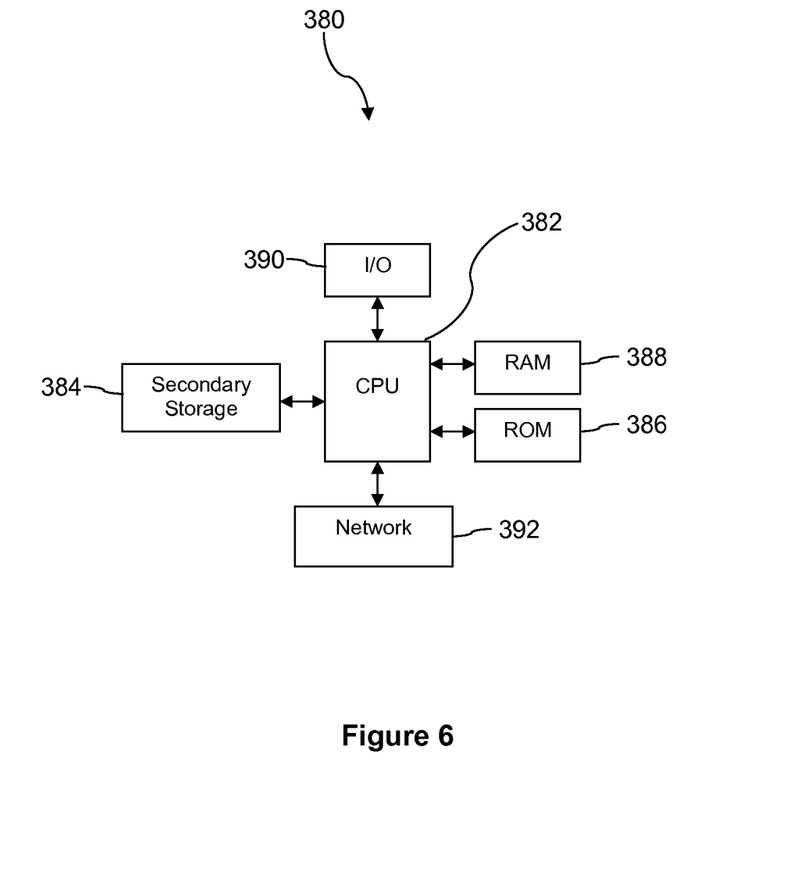
FIG. 6 is a block diagram of a computer system according to an embodiment of the disclosure.

FIG. 6 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A security system, comprising:
   a computer system;
   a memory accessible to the computer system;
   a data store comprising a plurality of consensus evaluations and a plurality of cyber threat analyst ratings; and
   an application stored in the memory that, when executed by the computer system:
      generates a cyber threat report based on user inputs, wherein the report comprises an identification of a cyber threat intent and the identification of a cyber threat technology,
      receives from a cyber threat analyst an input of a cyber threat frequency score associated with a set of cyber threat intelligence, an input of a cyber threat likelihood score associated with the set of cyber threat intelligence, and an input of a cyber threat capability score associated with the set of cyber threat intelligence, and
      generates a cyber threat intensity based on the cyber threat frequency score, based on the cyber threat likelihood score, based on the cyber threat capability score, and based on a cyber threat analyst rating of the plurality of cyber threat analyst ratings stored in the data store, wherein the cyber threat analyst rating indicates at least one accuracy of the cyber threat analyst in scoring at least one of a cyber threat frequency, a cyber threat likelihood, or a cyber threat capability, and wherein the cyber threat intensity is different depending on the cyber threat analyst rating,
   wherein the cyber threat report and the cyber threat intensity are used to select one or more cyber risk mitigation actions to manage a cyber risk of an enterprise or organization.

2. The system of claim 1, wherein the cyber threat analyst rating comprises a rating of the analyst's accuracy in scoring the cyber threat frequency, a rating of the analyst's accuracy in scoring the cyber threat likelihood, and a rating of the analyst's accuracy in scoring the cyber threat capability based on the set of cyber threat intelligence.

3. A method of mitigating cybercrime risk, comprising:
   determining a cyber threat analyst rating based on evaluating a scoring accuracy of a cyber threat analyst to score at least one of a cyber threat frequency, a cyber threat likelihood, and a cyber threat capability based on an evaluation set of cyber threat intelligence, wherein the cyber threat analyst rating indicates at least one accuracy of the cyber threat analyst in scoring the at least one of the cyber threat frequency, the cyber threat likelihood, or the cyber threat capability;
   receiving, by an application stored in a memory and executable by a processor, from the cyber threat analyst, an input of a cyber threat frequency score associated with a set of cyber threat intelligence, an input of a cyber threat likelihood score associated with the set of cyber threat intelligence, and an input of a cyber threat capability score associated with the set of cyber threat intelligence;
   determining, by the application, a cyber threat intensity based on the cyber threat frequency score, on the cyber threat likelihood score, and on the cyber threat capability score associated with the set of threat intelligence and based on the cyber threat analyst rating, wherein the cyber threat intensity is different depending on the cyber threat analyst rating; and
   deploying at least one electronic countermeasure to mitigate a cybercrime risk associated with the set of cyber threat intelligence based at least in part on the cyber threat intensity.

4. The method of claim 3, wherein the cyber threat analyst rating is determined based on scoring a plurality of independent sets of cyber threat intelligence and averaging a scoring accuracy over the plurality of independent sets of cyber threat intelligence.

5. The method of claim 3, wherein the cyber threat intensity is expressed as a value and a potential deviation from the value based on the cyber threat analyst rating.

6. The method of claim 3, wherein the cyber threat capability score is an estimate of a strength of a threat source and a cyber attack tool identified by the set of cyber threat intelligence.

7. The method of claim 3, wherein the cyber threat likelihood score is an estimate of a probability that a cyber threat identified by the set of cyber threat intelligence can succeed in actualizing its threat intent.

8. The method of claim 3, further comprising:
generating at least one standard score,
wherein the cyber threat analyst rating is determined by comparing at least one score of the threat analyst to the at least one standard score.

9. The method of claim 8, wherein the cyber threat analyst rating is expressed as a deviation from the at least one standard score.

10. The method of claim 3, further comprising:
determining a second cyber threat intensity based in part on deploying the at least one electronic countermeasure.

11. The method of claim 10, wherein the second cyber threat intensity is determined partly based on determining a second cyber threat frequency score, on determining a second cyber threat likelihood score, and on determining a second cyber threat capability score based on deploying the at least one electronic countermeasure and on the set of cyber threat intelligence.

12. A security system, comprising:
a computer system;
a memory accessible to the computer system; and
an application stored in the memory that, when executed by the computer system:
  accesses a cyber threat report including a cyber threat assessment generated by a cyber threat analyst, the cyber threat assessment including, for each of a plurality of identified cyber threats, one or more quantified components each comprising a score determined by the cyber threat analyst, the cyber threats potentially actualized as cyber attacks against any of a plurality of organizations;
  generates an evaluation of the cyber threats based on the cyber threat assessment and based on a cyber threat analyst rating of the cyber threat analyst accessed from a data store, wherein the cyber threat analyst rating indicates at least one accuracy of the cyber threat analyst in assessing the cyber threats, and wherein the evaluation of the cyber threats is different depending on the cyber threat analyst rating; and
  generates a cyber threat risk to an organization of the plurality of organizations based on the evaluation of the cyber threats and based on technology deployed by the organization, the cyber threat risk being provided by the application for use in selecting one or more cyber risk mitigation actions to manage the cyber risk of the organization.

13. The system of claim 12, wherein the evaluation of the cyber threats is determined by the application based on one or more quantified components comprising one or more cyber threat scores including one or more of a cyber threat frequency score, a cyber threat likelihood score, and a cyber threat capability score.

14. The system of claim 12, further comprising a cyber threat analyst calibration application stored in the memory that, when executed by the computer system:
  receives, via user input from the cyber threat analyst, one or more scores for a standard set of threat intelligence packages, wherein the one or more scores for each threat intelligence package of the standard set of threat intelligence packages comprises one or more of a cyber threat frequency score for the threat intelligence package, a cyber threat likelihood score for the threat intelligence package, and a cyber threat capability score for the threat intelligence package; and
  compares the one or more scores for each threat intelligence package of the standard set of threat intelligence packages to one or more standard scores for each threat intelligence package of the standard set of threat intelligence packages, wherein the cyber threat analyst rating is based on the comparison.

15. The system of claim 12, wherein the cyber threat analyst rating is based on testing performed by the cyber threat analyst prior to the application accessing the cyber threat report.

16. The system of claim 15, wherein the cyber threat analyst rating is based on an accuracy of the cyber threat analyst scoring of standard threats with respect to cyber threat frequency, an accuracy of the cyber threat analyst scoring cyber threat likelihood, and an accuracy of the cyber threat analyst scoring cyber threat capability.

17. The system of claim 12, wherein the cyber threat report further includes information for each of a plurality of cyber threats related to a cyber threat intent comprising a goal or object of a cyber threat, and cyber threat technology comprising a technology that the cyber threat may target, and wherein the cyber threat risk to the organization is generated based on the evaluation of the cyber threats including the cyber threat intent and the cyber threat technology.

18. The system of claim 17, wherein the evaluation of the cyber threats includes the application (i) determining potential effects or impact on the organization based on the cyber threat intent to which the organization may be susceptible, and (ii) matching the cyber threat technology with technology deployed by the organization.

19. A method of mitigating cybercrime risk, comprising:
accessing, by an application stored in a memory and executable by a processor, one or more stored scores regarding a cyber threat determined by an analyst and a rating of the analyst, wherein the rating of the analyst indicates at least one accuracy of the analyst in scoring each of a plurality of standard cyber threats;
generating, by the application, an evaluation of the cyber threat to an organization based on the one or more stored scores and based on the rating of the analyst, wherein the evaluation of the cyber threat is different depending on the rating of the analyst; and
deploying at least one electronic countermeasure to mitigate the cyber threat based at least in part on the evaluation of the cyber threat.

20. The method of claim 19, further including: receiving a cyber threat report including a cyber threat assessment generated by a cyber threat analyst, the cyber threat assessment including, for each of a plurality of identified cyber threats, one or more quantified components each comprising a score determined by the cyber threat analyst, the cyber threats potentially actualized as cyber attacks against any of a plurality of organizations, and the one or more stored scores being included as scores contained in the cyber threat report.

21. The method of claim 19, wherein generating the evaluation comprises determining a cyber threat risk to the organization based on technology deployed by the organization, the cyber threat risk being provided for use by the organization to select the at least one electronic countermeasure to manage the cyber risk of the organization.

22. The method of claim 19, further comprising: prior to receiving the one or more stored scores regarding the cyber threat, comparing, by a calibration application stored in a memory and executable by a processor, one or more scores received from the analyst for a plurality of independent sets of cyber threat intelligence to one or more standard scores for the plurality of independent sets of cyber threat intelligence, wherein the rating of the analyst is based on the comparison.

23. The method of claim 19, further comprising generating, by the application, a second evaluation of the cyber threat based in part on deploying the at least one electronic countermeasure.

* * * * *